United States Patent
Kim et al.

(10) Patent No.: US 12,176,166 B2
(45) Date of Patent: Dec. 24, 2024

(54) SOLID-STATE CIRCUIT BREAKER INCLUDES AIRGAP OPERATING MECHANISM CONFIGURED TO OPERATE IN LIMITED SPACE

(71) Applicant: Siemens Industry, Inc., Alpharetta, GA (US)

(72) Inventors: Raiden Jay Kim, Buford, GA (US); Guang Yang, Johns Creek, GA (US); Solomon R. Titus, Cumming, GA (US); Mark I. Shmukler, Duluth, GA (US); Huy Nguyen, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 244 days.

(21) Appl. No.: 17/820,790

(22) Filed: Aug. 18, 2022

(65) Prior Publication Data
US 2024/0062980 A1  Feb. 22, 2024

(51) Int. Cl.
*H01H 1/22* (2006.01)
*H01H 71/12* (2006.01)
*H02H 9/02* (2006.01)

(52) U.S. Cl.
CPC .......... *H01H 71/123* (2013.01); *H01H 1/225* (2013.01); *H02H 9/02* (2013.01)

(58) Field of Classification Search
CPC ........ H01H 1/2058; H01H 1/22; H01H 1/226; H01H 71/10; H01H 71/525; H01H 71/505; H01H 71/46; H01H 71/501; H01H 71/08; H01H 71/0228; H01H 71/2418; H01H 71/526; H01H 71/52; H01H 71/0207; H01H 71/123; H01H 33/42

See application file for complete search history.

(56) References Cited

U.S. PATENT DOCUMENTS

| | | | |
|---|---|---|---|
| 3,826,951 A * | 7/1974 | Mater | H01H 71/7409 361/100 |
| 4,618,745 A | 10/1986 | Thompson, III | |
| 4,650,944 A | 3/1987 | Tedesco et al. | |
| 5,021,819 A | 6/1991 | Candelora et al. | |
| 5,070,361 A | 12/1991 | Magnon et al. | |
| 5,931,289 A | 8/1999 | Chou | |
| 6,700,082 B1 * | 3/2004 | Gibson | H01H 71/126 200/50.08 |
| 2002/0158732 A1 | 10/2002 | Castonguay et al. | |

\* cited by examiner

*Primary Examiner* — Bryan R Perez

(57) ABSTRACT

A solid-state circuit breaker comprises an airgap operating mechanism including components and a housing that houses the components of the airgap operating mechanism such that each component in the operating mechanism is configured to operate in a way that only limited amount of space is required to achieve functions of ON, OFF, and TRIP. The components of the operating mechanism include a contact arm, a handle, and an interface feature to interface between the handle and the contact arm to apply a force thereon. The interface feature is configured to adjust the contact arm ensuring an optimal positioning. The components of the operating mechanism include a double pivot of the contact arm and a handle feature in that the contact arm has two-pivot legs, an armature, an armature pivot feature and a stopper feature, a cradle, and a stopper pin configured to stop the cradle during TRIP operation.

6 Claims, 11 Drawing Sheets

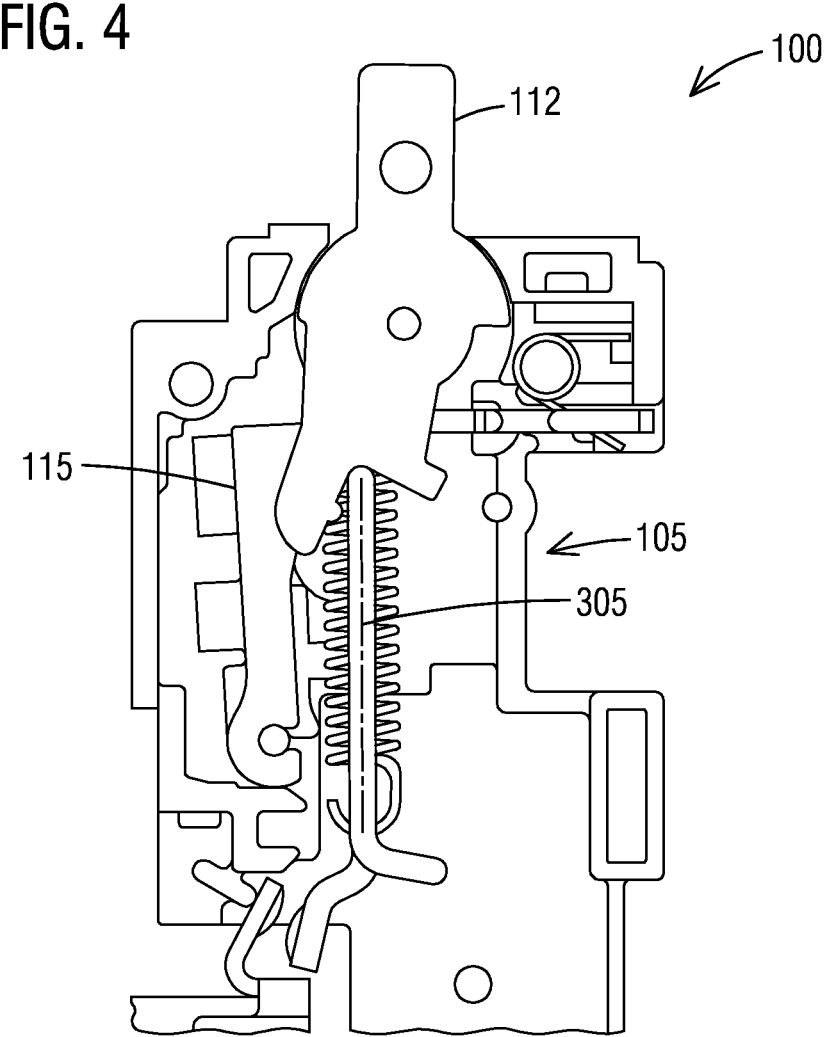

SOLID-STATE CIRCUIT BREAKER INCLUDES AIRGAP OPERATING MECHANISM CONFIGURED TO OPERATE IN LIMITED SPACE

BACKGROUND

1. Field

Aspects of the present invention generally relate to a solid-state circuit breaker that includes an airgap operating mechanism including components which are configured to operate in a way that only limited amount of space is required to achieve functions of ON, OFF, and TRIP as the airgap operating mechanism is "relatively small" or "significantly smaller compared to traditional mechanism" or "comparatively compact."

2. Description of the Related Art

Solid-state electronic residential circuit breaker removes the need for an arc extinguishing chamber and long contact separation distance seen in a traditional residential circuit breaker. These space-consuming features were required in a traditional breaker to help extinguishing arc. However, in a solid-state breaker, there is no arc. The solid-state electronics utilizes semiconductors and software algorithms to detect and interrupt fault currents substantially faster than a traditional residential circuit breaker. Since it does not rely on contact separation to interrupt a fault current, it is not necessary to have numerous components utilized in the operating mechanism of a traditional breaker. There still needs to be a small separation in the circuit between contacts, or air gap, for dielectric safety purposes when the breaker is tripped or turned off. However, since the solid-state electronics take most of the space inside the breaker, there is an extremely limited amount of space to accommodate an operating mechanism.

The airgap operating mechanism addresses this problem. This assembly provides a small airgap between contacts and utilizes a significantly smaller space compared to other existing breaker operating mechanisms. Solid-state breaker requires a substantial amount of space for its electronic parts.

Before the development of solid-state breaker, residential circuit breakers relied on long contact separation distance to extinguish the arc that is generated when the breaker TRIPS or turns OFF. Bimetal and instantaneous magnet were the key components in detecting overcurrent, and the calibration screw was needed to calibrate the bimetal. These components along with long contact separation for arc required the overall operating mechanism to take up a significant amount of space. This not only led to the overall size of a circuit breaker to be big, but also made the overall cost to io be high.

Therefore, there is a need for a better airgap operating mechanism for a solid-state circuit breaker.

SUMMARY

Briefly described, aspects of the present invention relate to an airgap operating mechanism for a solid-state circuit breaker. The newly designed airgap operating mechanism is comparatively compact and, therefore, allocates sufficient space for the electronics within otherwise limited room inside the circuit breaker. As the overall size of the breaker become smaller, it can become more efficient with space-usage, and it is generally cheaper when the parts are smaller. The airgap operating mechanism achieves functions of manually turning the breaker ON and OFF, and TRIP using an electromagnet to provide airgap. In addition, the mechanism assembles inside a modular package, allowing flexibility to implement in different future designs. The modular assembly could be built as a sub-assembly and be used in different products to serve the same purpose.

In accordance with one illustrative embodiment of the present invention, a solid-state circuit breaker comprises an airgap operating mechanism including components and a housing that houses the components of the airgap operating mechanism such that each component in the operating mechanism is configured to achieve functions of ON, OFF, and TRIP. The components of the operating mechanism include a contact arm, a handle, and an interface feature between the handle and the contact arm to adjust the contact arm ensuring an optimal positioning.

In accordance with one illustrative embodiment of the present invention, a solid-state circuit breaker comprises an airgap operating mechanism including components and a housing that houses the components of the airgap operating mechanism such that each component in the operating mechanism is configured to achieve functions of ON, OFF, and TRIP. The components of the operating mechanism include a contact arm, a handle, and a double pivot of the contact arm and a handle feature in that the contact arm has two-pivot legs to provide a double pivot of the contact arm and the handle such that the two-pivot legs reduce a pop-out force, which is a detrimental force from an operating spring pushing parts out of the solid-state circuit breaker during an assembly process.

In accordance with one illustrative embodiment of the present invention, a solid-state circuit breaker comprises an airgap operating mechanism including components and a housing that houses the components of the airgap operating mechanism such that each component in the operating mechanism is configured to achieve functions of ON, OFF, and TRIP. The components of the operating mechanism include a contact arm, a handle, an armature, and an armature pivot feature and a stopper feature that work together to allow the armature to be able to have a stable pivot and a reset mechanism.

In accordance with one illustrative embodiment of the present invention, a solid-state circuit breaker comprises an airgap operating mechanism including components and a housing that houses the components of the airgap operating mechanism such that each component in the operating mechanism is configured to achieve functions of ON, OFF, and TRIP. The components of the operating mechanism include a contact arm, a handle, a cradle, and a stopper pin configured to stop the cradle during a TRIP operation utilizes less space in comparison to a traditional method of using a thick plastic wall to surround the cradle at its stop.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 4 illustrates a solid-state circuit breaker operating mechanism at an over-center position turning OFF in accordance with an exemplary embodiment of the present invention.

DETAILED DESCRIPTION

Figure 1:
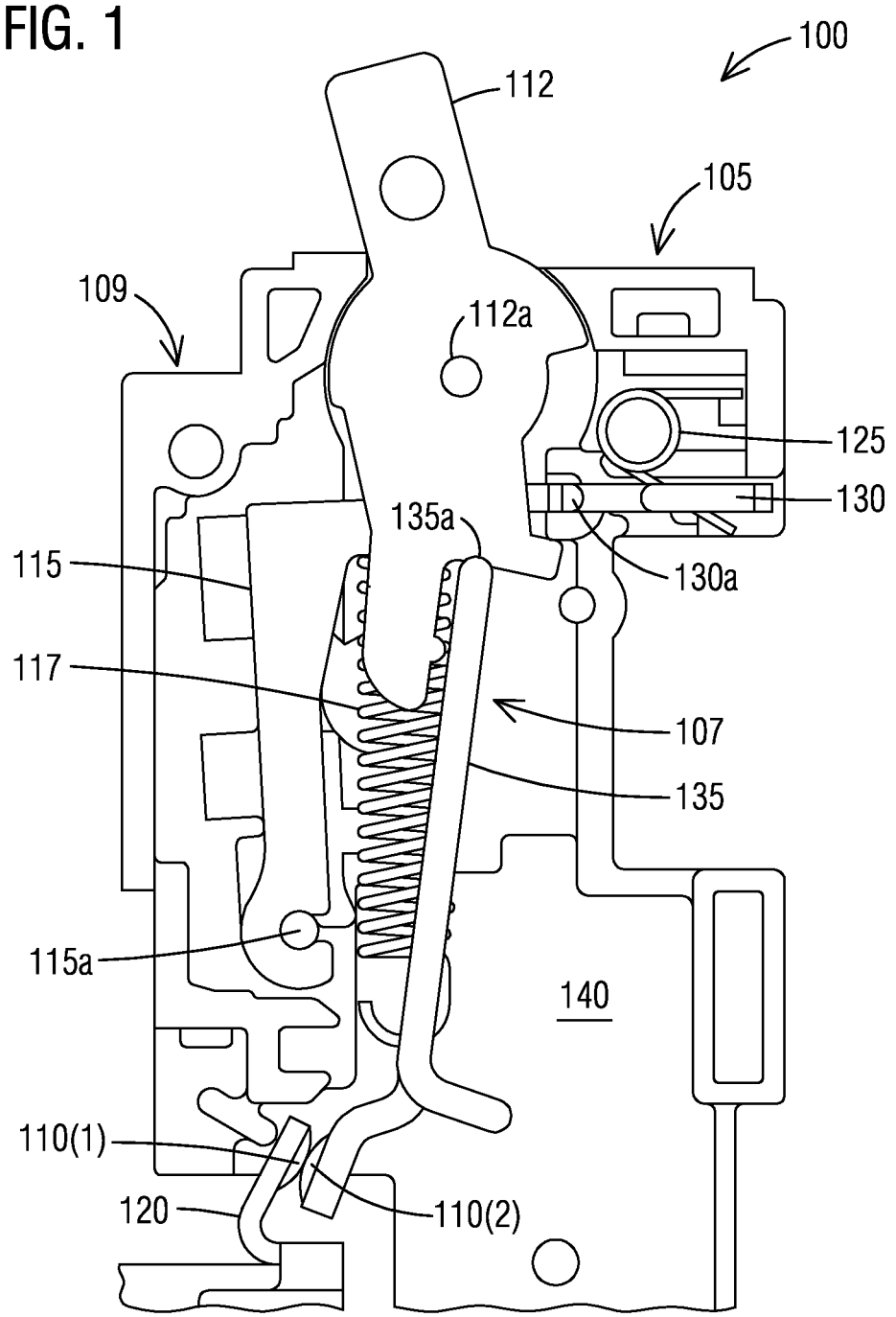
FIG. 1 illustrates a solid-state circuit breaker operating mechanism at an ON position in accordance with an exemplary embodiment of the present invention.

Various technologies that pertain to systems and methods that facilitate an airgap operating mechanism for a solid-state circuit breaker will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an airgap operating mechanism for a solid-state circuit breaker. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the airgap operating mechanism for a solid-state circuit breaker according to the present disclosure are described below with reference to FIGS. 1-16 herein. Like reference numerals used in the drawings identify similar or identical elements throughout the several views. The drawings are not necessarily drawn to scale.

Consistent with one embodiment of the present invention, FIG. 1 represents a solid-state circuit breaker 100 including a compact airgap operating mechanism 105 at an ON position in accordance with an exemplary embodiment of the present invention. The compact airgap operating mechanism 105 includes components 107. The solid-state circuit breaker 100 includes a housing 109 that houses the components 107 of the compact airgap operating mechanism 105 such that each component in the operating mechanism 105 is configured to operate in a way that only limited amount of space is required to achieve functions of ON, OFF, and TRIP. Since the solid-state circuit breaker 100 has a very limited amount of space for the operating mechanism 105, the most crucial aspect of the new airgap mechanism design is the fact that it is compact and still achieves ON, OFF, and TRIP functions of a breaker.

Figure 2:
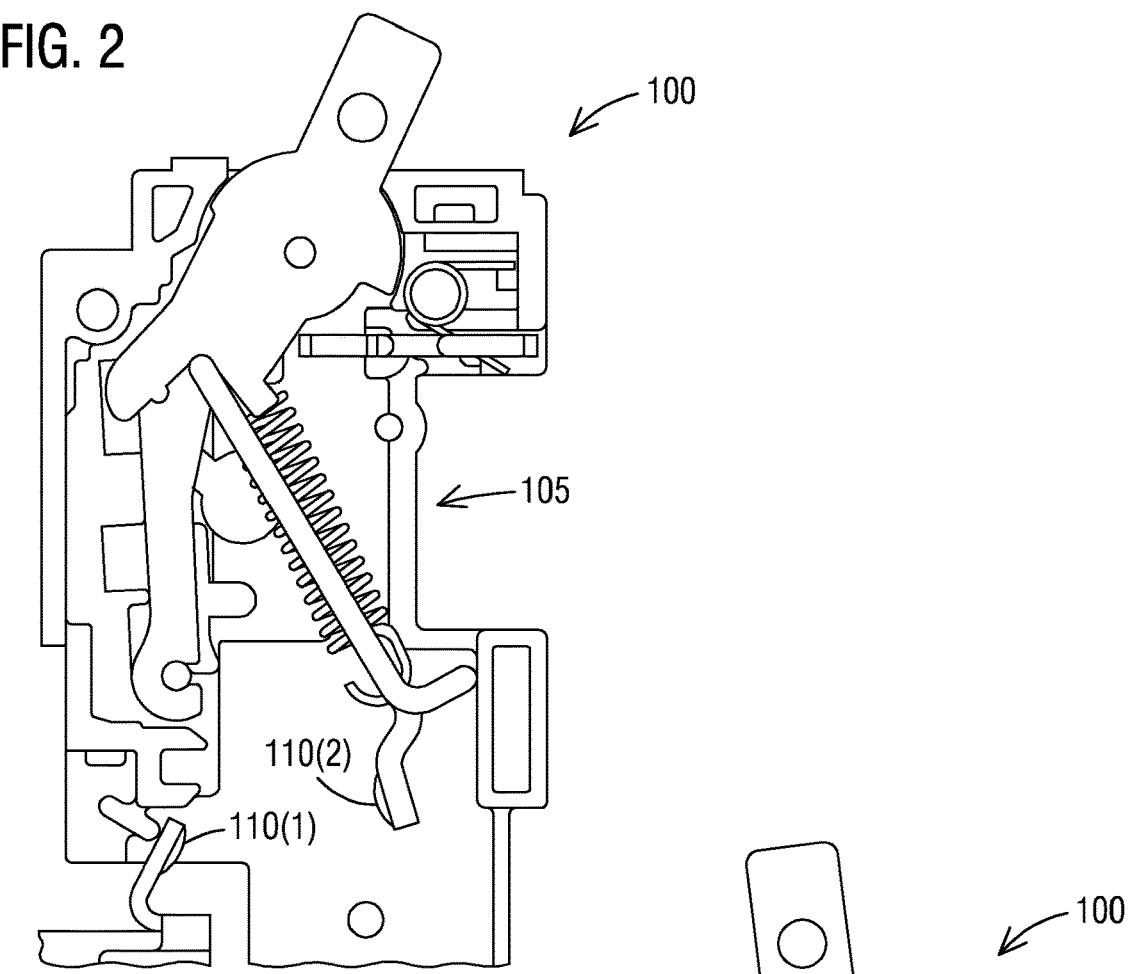
FIG. 2 illustrates a solid-state circuit breaker operating mechanism at an OFF position in accordance with an exemplary embodiment of the present invention.

FIGS. 1-16 will be shown to explain the three positions first, then key features that assist the operating mechanism 105 to achieve these positions will be discussed. Referring now to FIG. 2, it illustrates the solid-state circuit breaker 100 including the operating mechanism 105 at an OFF position in accordance with an exemplary embodiment of the present invention. FIG. 1 and FIG. 2 show the solid-state circuit breaker 100 at an ON position and an OFF position, respectively. At the ON position, a circuit is closed and an electrical current flows. At the OFF position, contacts 110 (1-2) are separated to provide an air gap for a dielectric separation.

The components 107 of the airgap operating mechanism 105 include a handle 112 and a handle pivot 112a. The components 107 further include a cradle 115, an operating spring 117, a cradle pivot 115a and a line terminal 120. The components 107 further include a reset spring 125, an armature 130 and an armature pivot 130a. The components 107 further include a contact arm 135 and a contact arm pivot 135a. The components 107 further include a base 140.

Figure 3:
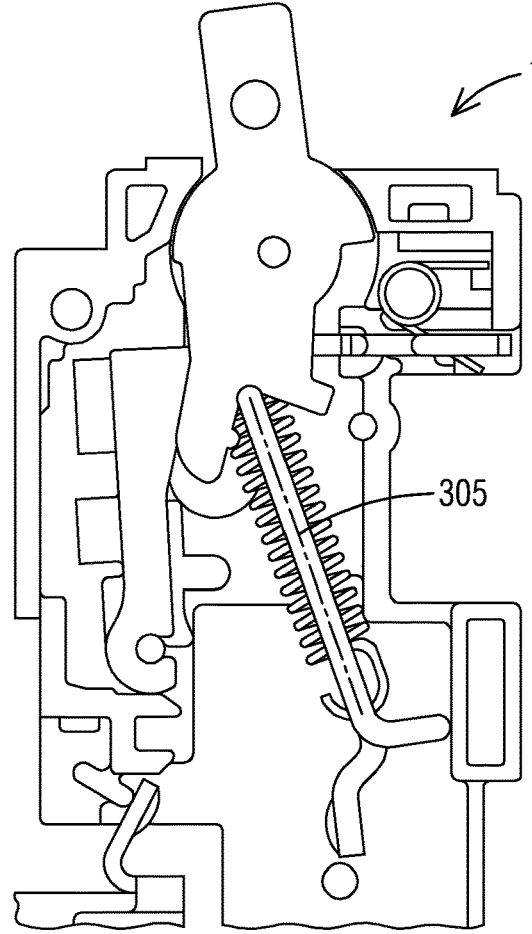
FIG. 3 illustrates a solid-state circuit breaker operating mechanism at an over-center position turning ON in accordance with an exemplary embodiment of the present invention.

The operating mechanism 105 utilizes a concept called "over-center" toggle when turning ON and OFF. When an imaginary line drawn from the pivot 135a of the contact arm 135 to a point of the operating spring 117 connection to the contact arm 135 it aligns with a force vector of the operating spring 117 itself, this position is called an over-center position. In this position, the operating spring 117 toggles its direction of pull relative to the contact arm 135 and drives the mechanism either ON or OFF. Turning now to FIG. 3, it shows the over-center when turning the mechanism 105 ON. FIG. 3 illustrates the solid-state circuit breaker operating mechanism 105 at an over-center position turning ON in accordance with an exemplary embodiment of the present invention. An over-center line 305 is shown in FIG. 3.

FIG. 4 illustrates the solid-state circuit breaker operating mechanism 105 at an over-center position turning OFF in accordance with an exemplary embodiment of the present invention. FIG. 4 shows the over-center when turning the mechanism 105 OFF. In summary, a user only needs to drive the handle 112 past the over-center position far enough to account for friction in the system, and then the mechanism 105 will drive the assembly to switch either ON or OFF, depending on the direction the handle 112 is being rotated.

A TRIP operation starts when the solid-state circuit breaker 100 is initially at its ON position, but an electronic module detects a fault current and activates an electromagnet to trigger a contact separation routine. This happens in a sequential order where the electromagnet magnetizes and attracts the armature 130, which then rotates clockwise, thus releasing the cradle 115 and allowing it to dynamically rotate toward a Trip-Stopper.

Figure 5A:
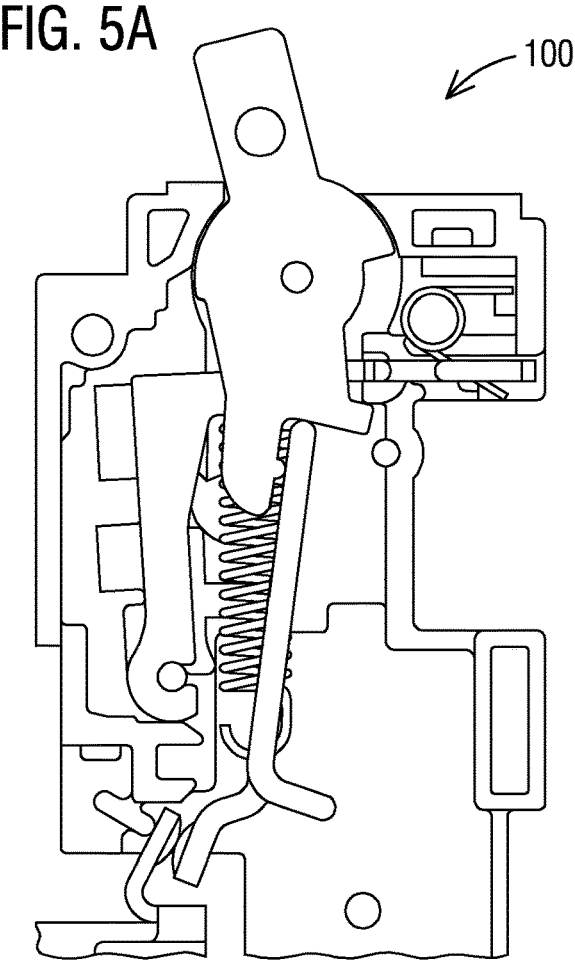
FIGS. 5A-5B illustrate a side-by-side comparison of the ON position and a first TRIP sequence in accordance with an exemplary embodiment of the present invention.
Figure 5B:
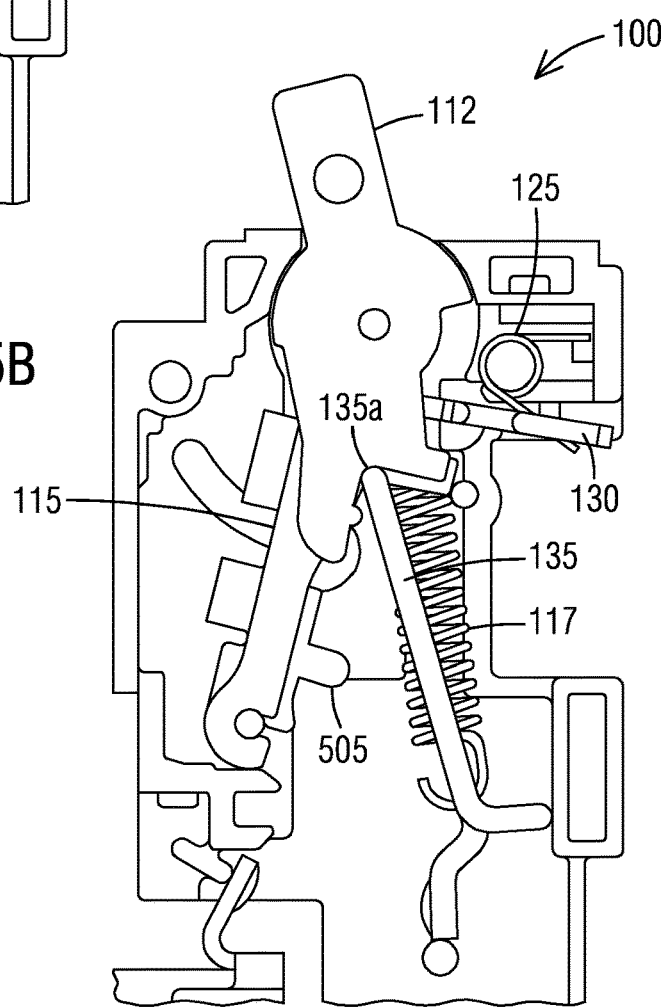

As seen in FIGS. 5A-5B, they illustrate a side-by-side comparison of the ON position and a first TRIP sequence in accordance with an exemplary embodiment of the present invention. A kicker feature 505 on the cradle 115 pushes the contact arm 135 causing immediate separation of contacts and initiating counterclockwise rotation of the contact arm 135. At a certain position of the cradle 115, the operating spring 117 starts biasing the contact arm 135 continuing its rotation to the trip position, as the cradle 115 rotates clockwise.

Figure 6:
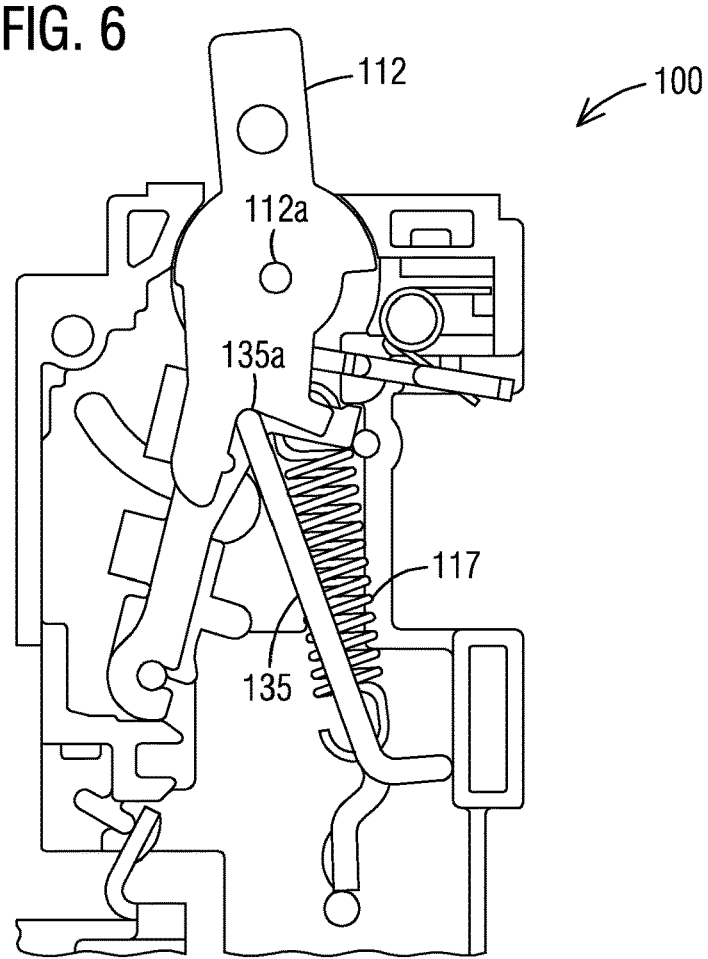
FIG. 6 illustrates a second TRIP sequence in accordance with an exemplary embodiment of the present invention.
Figure 7:
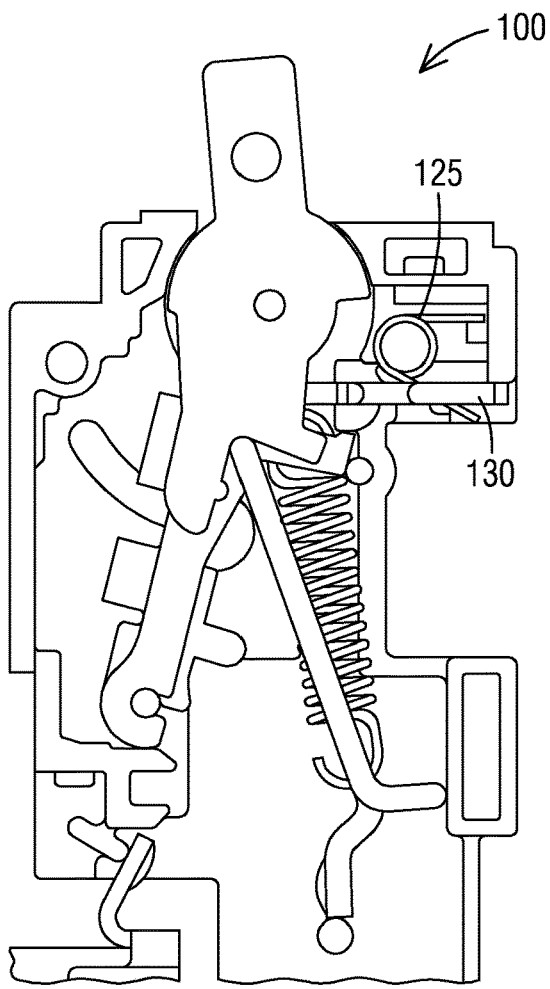
FIG. 7 illustrates a final TRIP position in accordance with an exemplary embodiment of the present invention.

As shown in FIG. 6, it illustrates a second TRIP sequence in accordance with an exemplary embodiment of the present invention. In FIG. 7, it illustrates a final TRIP position in accordance with an exemplary embodiment of the present invention.

FIGS. 5A-5B display the difference between the ON and the first sequence of the TRIP operation. Due to an angle of the operating spring 117 pulling on the contact arm 135, there is a reaction force at an interface between the contact arm pivot 135a and the handle 112. A moment arm of this reaction force with respect to the handle pivot 112a, creates a torque causing the handle 112 to rotate clockwise to its neutral position, where it rests a second sequence as shown in FIG. 6. Finally, during a third sequence, the reset spring 125 pulls the armature 130 back to its original position as shown in FIG. 7, and the mechanism finishes its TRIP operation in a Trip-Neutral position.

Figure 8A:
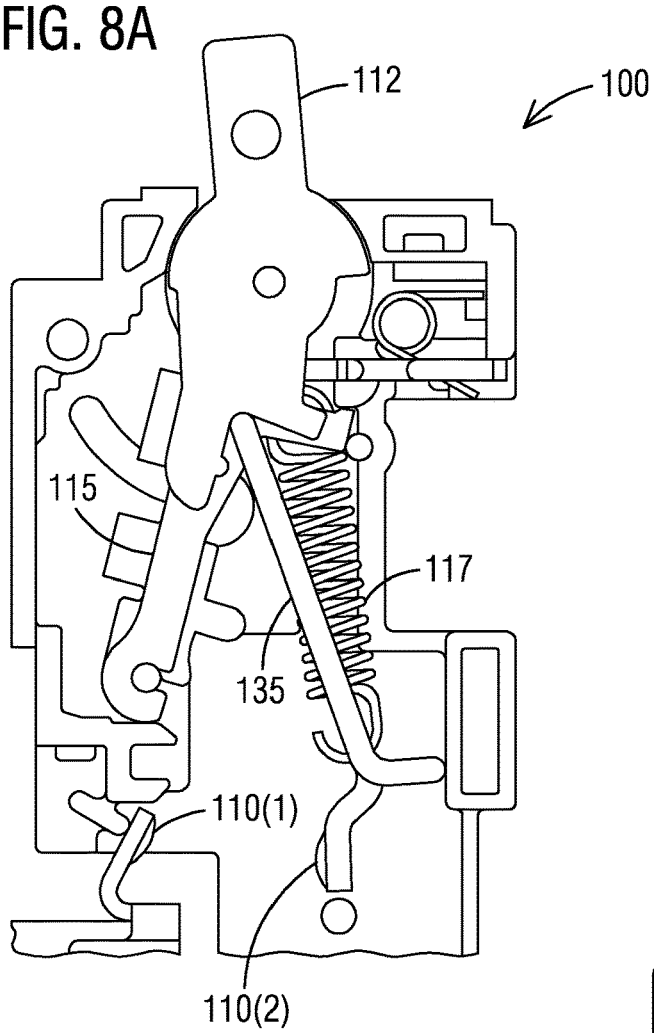
FIGS. 8A-8B illustrate a side-by-side comparison of a TRIP position and an OFF position in accordance with an exemplary embodiment of the present invention.
Figure 8B:
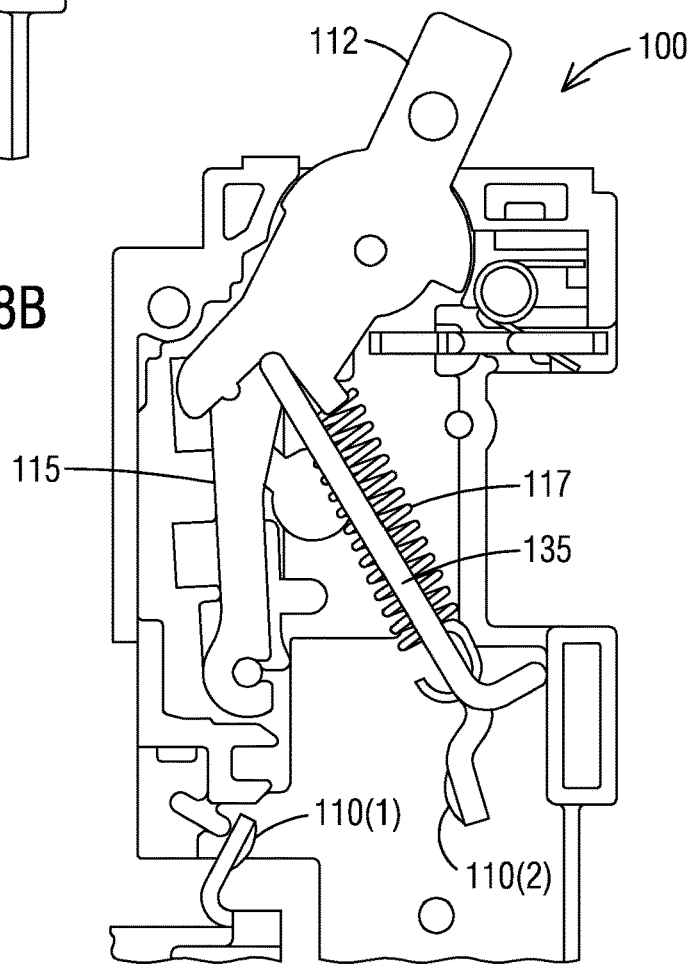

With regard to FIGS. 8A-8B, they illustrate a side-by-side comparison of a TRIP position and an OFF position in accordance with an exemplary embodiment of the present invention. Once at TRIP, the solid-state circuit breaker 100 must be turned to OFF position before it can be turned ON again. Difference between TRIP and OFF positions are shown in FIGS. 8A-8B. Because of the operating spring 117 alignment at TRIP, even if a user tries to rotate the handle 112 counterclockwise, the operating spring 117 continues to pull the contact arm 135 toward its open position and the contacts 110(1-2) would not close. The handle 112 has to rotate clockwise, instead, in order to turn the solid-state circuit breaker 100 OFF. Then, at an OFF position cradle 115 can re-latch on the armature 130 during subsequent switching ON operation, when the handle 112 is being rotated in a counterclockwise direction.

Figure 9:
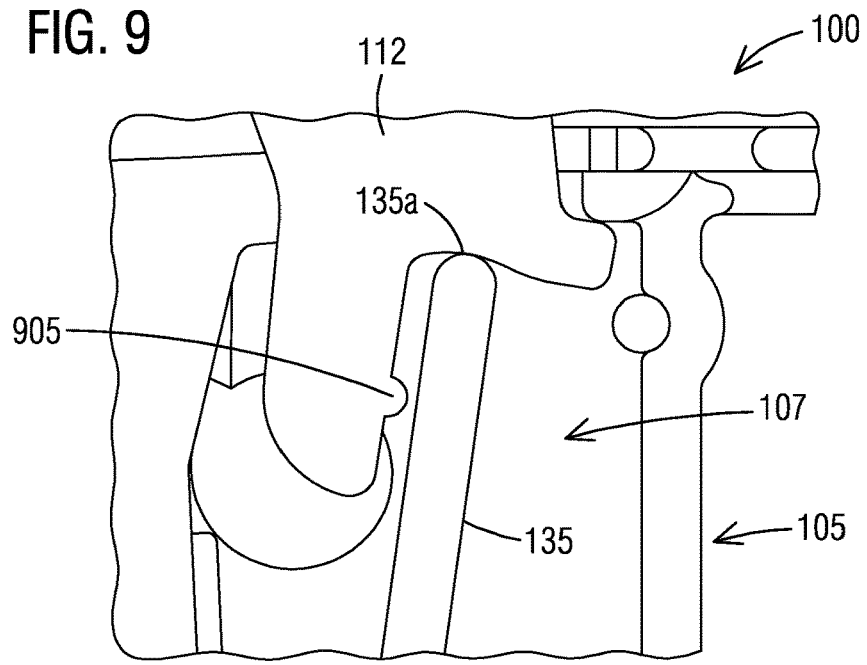
FIG. 9 illustrates a pivot-kicker adjusting a pivot of a contact arm in accordance with an exemplary embodiment of the present invention.

With respect to FIG. 9, it illustrates an interface feature 905 such as a pivot-kicker feature adjusting a pivot 135a of the contact arm 135 in accordance with an exemplary embodiment of the present invention. The components 107 of the operating mechanism 105 include the contact arm 135, the handle 112 and the interface feature 905 to interface between the handle 112 and the contact arm 135 to apply a force thereon. The interface feature 905 is configured to adjust the contact arm 135 ensuring an optimal positioning. The interface feature 905 is configured to adjust the contact arm 135 ensuring the optimal positioning when the operating mechanism 105 is at an ON state so that the interface feature 905 enables the operating mechanism 105 to have a specific pre-determined contact force which reduces contact resistance and have a mechanism stability at an ON position.

Figure 10:
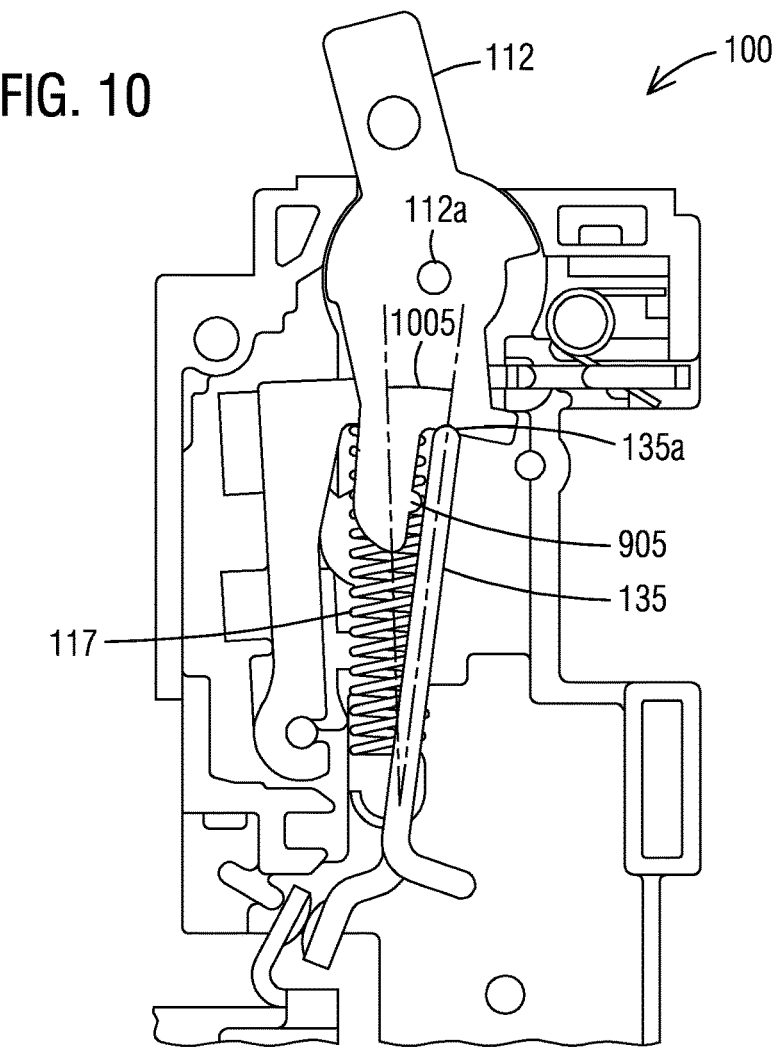
FIG. 10 illustrates an alpha angle between an operating spring and a contact arm in accordance with an exemplary embodiment of the present invention.

FIG. 10 illustrates an alpha angle 1005 between the operating spring 117 and the contact arm 135 in accordance with an exemplary embodiment of the present invention. A higher alpha angle 1005 leads to a higher contact force, which is an important mechanism performance metric.

A key feature about a handle interface with the contact arm 135 is a pivot-kicker feature 905 on the handle 112. When the contact arm 135 rotates counterclockwise to turn ON, the contact arm 135 is blocked by a bump, called in this disclosure a pivot-kicker, which becomes its momentary center of rotation. As a result, a pivot of the contact arm 135 is biased to the right side of its interface cam with the handle 112. This makes the alpha angle 1005, shown in FIG. 10, to be bigger than if the contact arm pivot 135a was biased to the left such that the higher alpha angle 1005 leads to a higher contact force. Having a sufficient contact force leads to reduced contact resistance and increased mechanism stability. For OFF and TRIP operations, the contact arm pivot 135a slides to the left side of the handle pivot 112a. For a TRIP operation, this helps to rotate the handle 112 to a neutral position.

Figure 11:
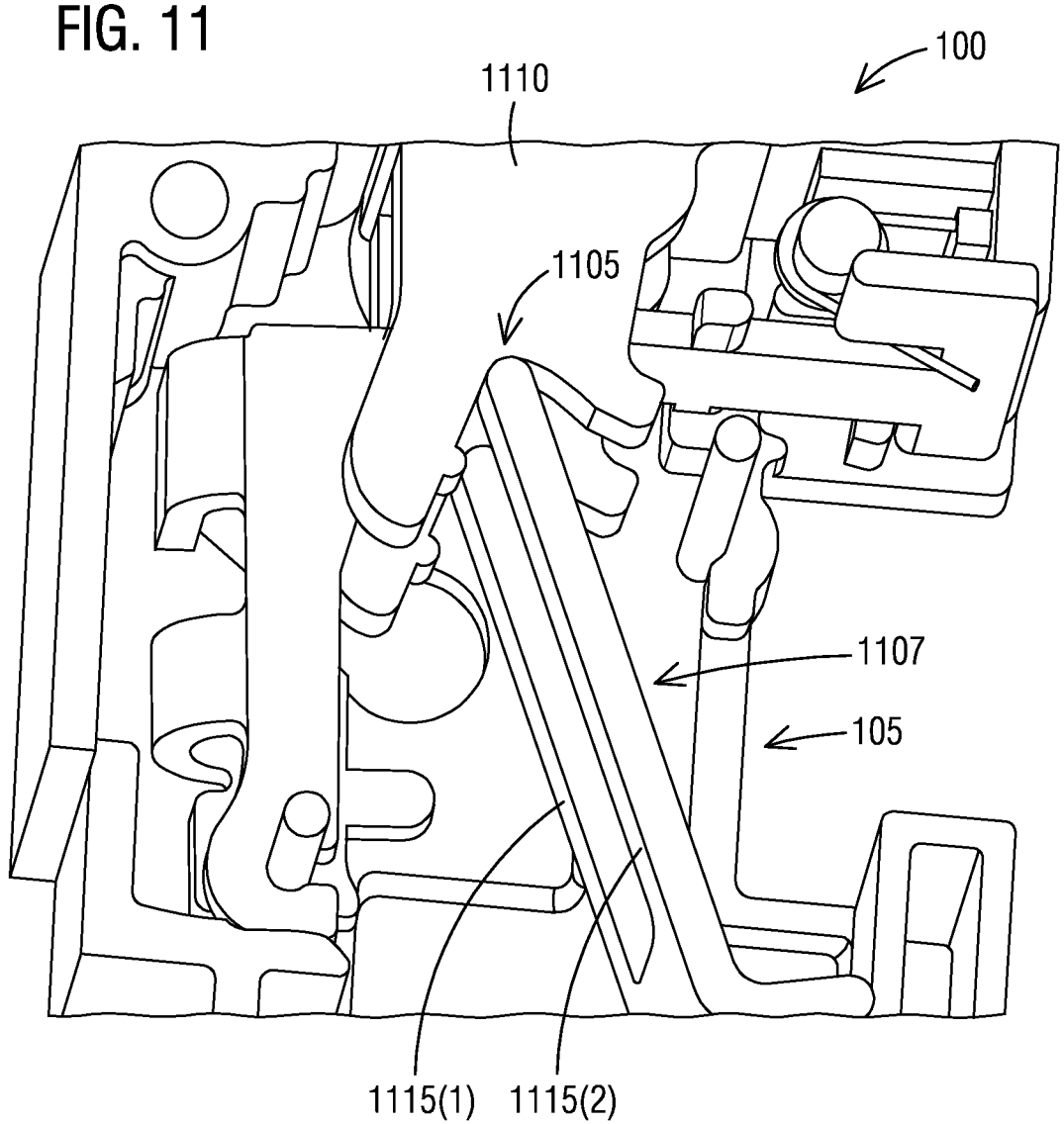
FIG. 11 illustrates a double pivot of a contact arm and a handle in accordance with an exemplary embodiment of the present invention.

FIG. 11 illustrates a double pivot 1105 of a contact arm 1107 and a handle 1110 in accordance with an exemplary embodiment of the present invention. The components of the operating mechanism 105 include the double pivot 1105 of the contact arm 1107 and the handle 1110 feature in that the contact arm 1107 has two-pivot legs 1115(1-2) to provide the double pivot such that the two-pivot legs 1115(1-2) reduce a pop-out force, which is a detrimental force from the operating spring 117 pushing parts out of the solid-state circuit breaker 100 during an assembly process.

As stated above an important aspect about the contact arm 1107 is that it has the two-pivot legs 1115(1-2) that reduce a pop-out force. The double pivot 1105 of the contact arm 1107 interfacing with the handle 1110 is shown in FIG. 11. If it were a one-pivot system, there would be a net force biasing to one side, towards outside of the breaker 100 during the assembly process when the operating spring 117 is being hooked on to a contact arm. The two-pivot system prevents this issue.

Figure 12:
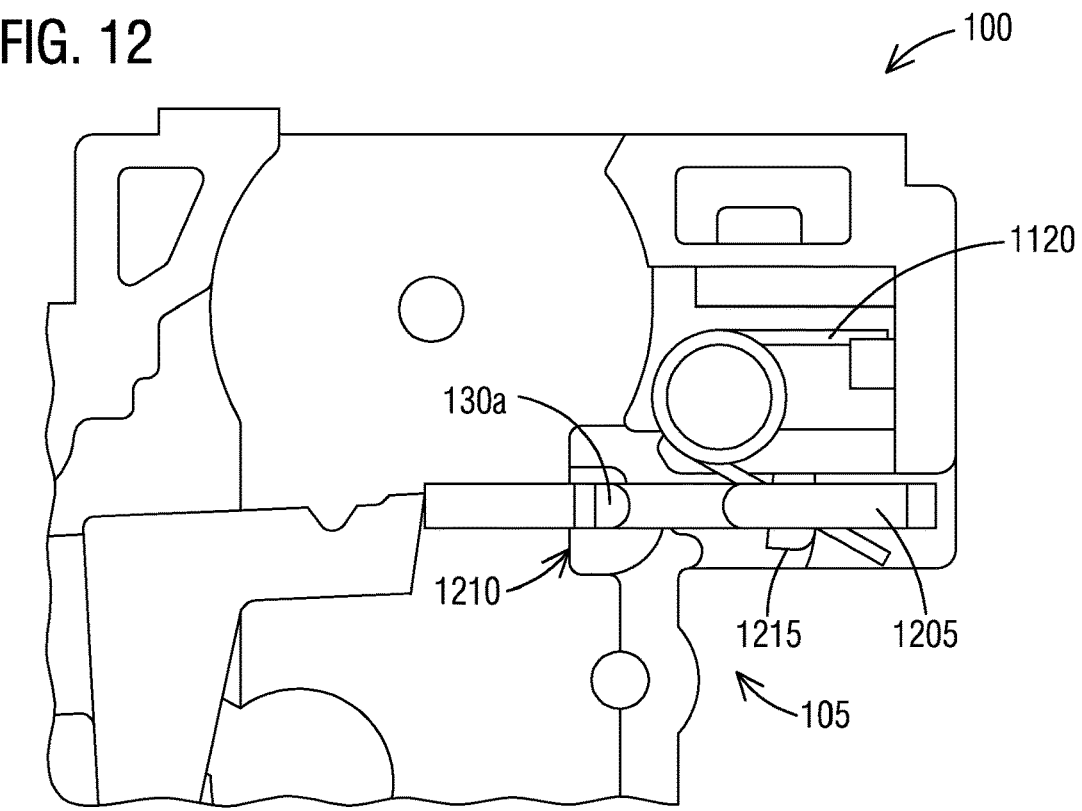
FIG. 12 illustrates an armature at an OFF position in accordance with an exemplary embodiment of the present invention.
Figure 13:
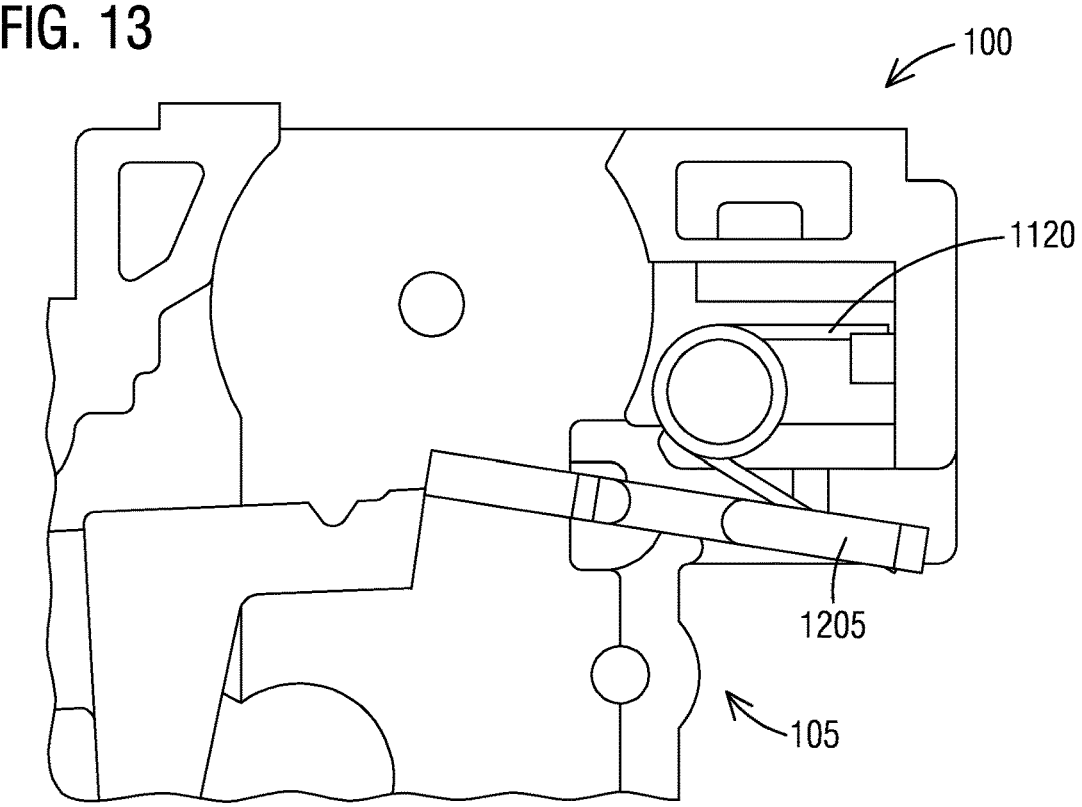
FIG. 13 illustrates an armature at a TRIP position in accordance with an exemplary embodiment of the present invention.

FIG. 12 illustrates an armature at an OFF position in accordance with an exemplary embodiment of the present invention. FIG. 13 illustrates an armature at a TRIP position in accordance with an exemplary embodiment of the present invention.

The components of the operating mechanism 105 include an armature 1205, an armature pivot feature 1210 and a stopper feature 1215 that work together to allow the armature 1205 to be able to have a stable pivot and a reset mechanism. A unique armature design saves space by having the armature pivot feature 1210 and the stopper feature 1215. Referring to FIG. 12, it is showing the armature 1205 at an OFF position with a reset spring 1120 latched on it. On one side of the armature 1205, there is a round pivot sitting in the plastic base. However, the plastic base does not have a wall fully around the pivot, so the armature 1205 could pop out from the pivot. The stopper feature 1215 prevents this by riding on the wall drawing an arc on the right. This prevents the armature 1205 from moving to the left as it rotates on its pivot during TRIP and turn OFF operations. FIG. 13 depicts the TRIP position of the armature 1205. Once the breaker finishes the TRIP operation, the armature 1205 goes to the OFF position as shown in FIG. 12.

Figure 14:
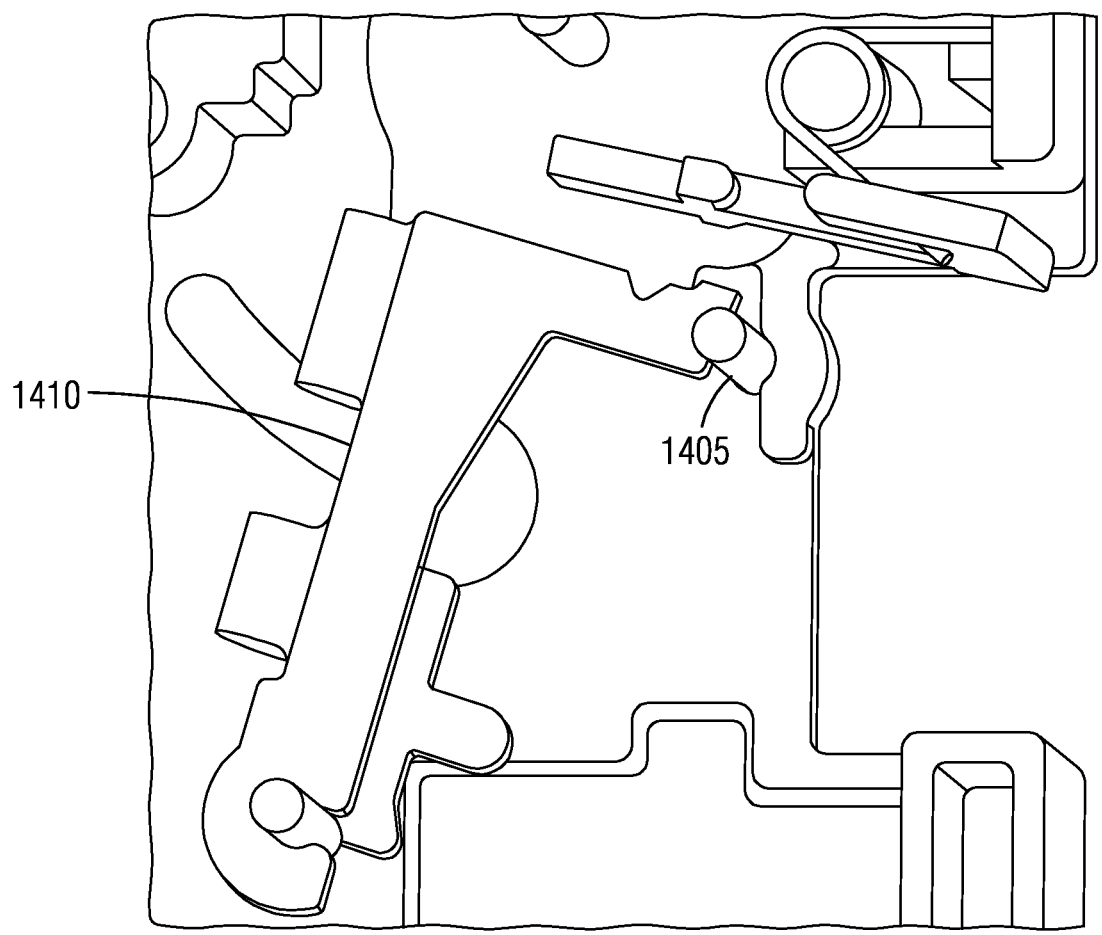
FIG. 14 illustrates a stopper pin and a cradle at a TRIP position in accordance with an exemplary embodiment of the present invention.

FIG. 14 illustrates a stopper pin 1405 and a cradle 1410 at a TRIP position in accordance with an exemplary embodiment of the present invention. The components of the operating mechanism 105 include the cradle 1410 and the stopper pin 1405 configured to stop the cradle 1410 during a TRIP operation utilizes less space in comparison to a traditional method of using a thick plastic wall to surround the cradle 1410 at its stop.

The stopper pin 1405 used to stop the cradle 1410 during the TRIP operation takes up significantly less space than having a base wall built up to stop the cradle 1410. The stopper pin 1405 stopping the cradle 1410 during the TRIP operation is shown in FIG. 14. If the stopper pin 1405 was not used, then the base plastic would need to have a thick wall that is also relatively taller than other base features. Therefore, the stopper pin 1405 provides design flexibility in the area that otherwise would have to be filled with thick plastic materials to withstand the impact from the cradle 1410 during the TRIP operation.

An interface between the handle and the contact arm facilitates the positioning of the pivot point. The bump is on the handle can easily be on the contact arm to perform the same function.

Figure 15:
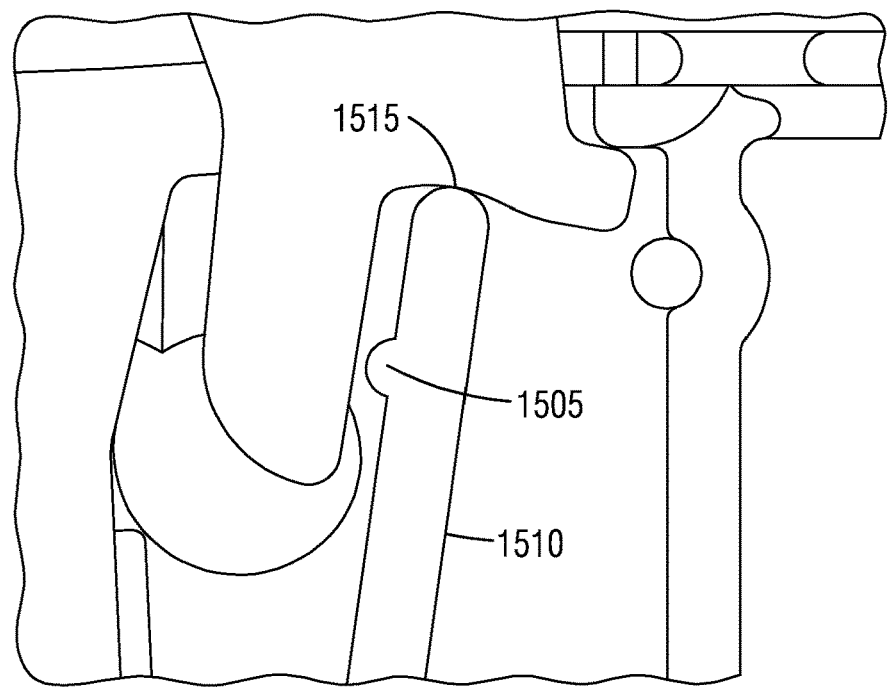
FIG. 15 illustrates an interface feature on a contact arm in accordance with an exemplary embodiment of the present invention.

FIG. 15 illustrates an interface feature 1505 on a contact arm 1510 in accordance with an exemplary embodiment of the present invention. A contact arm pivot 1515 and a pivot-adjuster as the interface feature 1505 on the contact arm 1510 is shown in FIG. 15. For example, a bump on the contact arm 1510 is provided instead of a bump on a handle.

Figure 16:
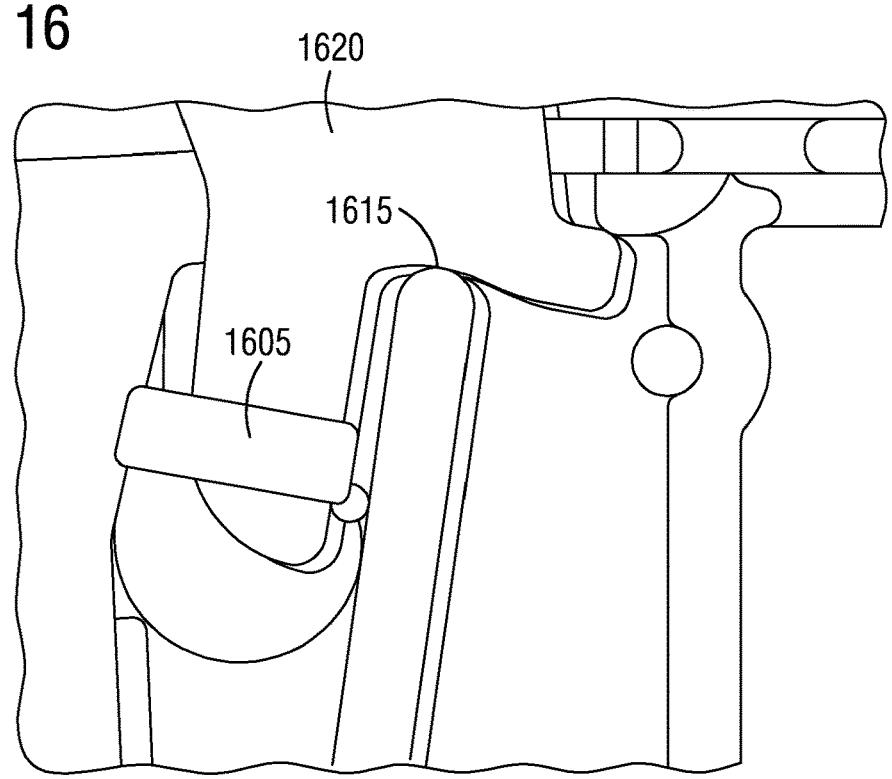
FIG. 16 illustrates an interface feature on an external part in accordance with an exemplary embodiment of the present invention.

FIG. 16 illustrates an interface feature 1605 on an external part in accordance with an exemplary embodiment of the present invention. A contact arm pivot 1615 and an external pivot-adjuster as the interface feature 1605 is shown in FIG. 16. It attaches a third piece into the assembly to interface with a handle 1620 and the contact arm pivot 1615.

While a design of a solid-state circuit breaker is described here a range of one or more other circuit breakers are also contemplated by the present invention. For example, other circuit breakers may be implemented based on one or more features presented above without deviating from the spirit of the present invention.

The techniques described herein can be particularly useful for an interface feature to interface between a handle and a contact arm such as a bump feature. While particular embodiments are described in terms of the bump feature, the techniques described herein are not limited to such interfaces but can also be used with other interface features.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A solid-state circuit breaker comprising:
   an airgap operating mechanism including components; and
   a housing that houses the components of the airgap operating mechanism such that each component in the operating mechanism is configured to achieve functions of ON, OFF, and TRIP, wherein the components of the operating mechanism include:
   a contact arm,
   a handle,
   an interface feature between the handle and the contact arm to adjust the contact arm ensuring an optimal positioning,
   a double pivot of the contact arm and a handle feature in that the contact arm has two-pivot legs to provide a double pivot of the contact arm and the handle such that the two-pivot legs reduce a pop-out force, which is a detrimental force from an operating spring pushing parts out of the solid-state circuit breaker during an assembly process,
   an armature,
   an armature pivot feature and a stopper feature that work together to allow the armature to be able to have a stable pivot and a reset mechanism,
   a cradle, and
   a stopper pin configured to stop the cradle during a TRIP operation utilizes less space in comparison to a traditional method of using a thick plastic wall to surround the cradle at its stop.

2. The solid-state circuit breaker of claim 1, wherein the interface feature is configured to adjust the contact arm ensuring the optimal positioning when the operating mechanism is at an ON state so that the interface feature enables the operating mechanism to have a specific pre-determined force which reduces contact resistance and have a mechanism stability at an ON position.

3. A solid-state circuit breaker comprising:
   an airgap operating mechanism including components; and
   a housing that houses the components of the airgap operating mechanism such that each component in the operating mechanism is configured to achieve functions of ON, OFF, and TRIP,
   wherein the components of the operating mechanism include:
   a contact arm,
   a handle,
   an armature,
   an armature pivot feature and a stopper feature that work together to allow the armature to be able to have a stable pivot and a reset mechanism,
   a cradle, and
   a stopper pin configured to stop the cradle during a TRIP operation utilizes less space in comparison to a traditional method of using a thick plastic wall to surround the cradle at its stop.

4. The solid-state circuit breaker of claim 3, wherein the components of the operating mechanism include:
   an interface feature to interface between the handle and the contact arm to apply a force thereon, the interface feature is configured to adjust the contact arm ensuring an optimal positioning.

5. The solid-state circuit breaker of claim 4, wherein the interface feature is configured to adjust the contact arm ensuring the optimal positioning when the operating mechanism is at an ON state so that the interface feature enables the operating mechanism to have a specific pre-determined force which reduces contact resistance and have a mechanism stability at an ON position.

6. A solid-state circuit breaker comprising:
   an airgap operating mechanism including components; and
   a housing that houses the components of the airgap operating mechanism such that each component in the operating mechanism is configured to achieve functions of ON, OFF, and TRIP,
   wherein the components of the operating mechanism include:
   a contact arm,
   a handle,
   a double pivot of the contact arm and a handle feature in that the contact arm has two-pivot legs to provide a double pivot of the contact arm and the handle such that the two-pivot legs reduce a pop-out force, which is a detrimental force from an operating spring pushing parts out of the solid-state circuit breaker during an assembly process, an armature, an armature pivot feature and a stopper feature that work together to allow the armature to be able to have a stable pivot and a reset mechanism, a cradle, and a stopper pin configured to stop the cradle during a TRIP operation utilizes less space in comparison to a traditional method of using a thick plastic wall to surround the cradle at its stop.

* * * * *